(12) United States Patent
Ota et al.

(10) Patent No.: US 8,677,741 B2
(45) Date of Patent: *Mar. 25, 2014

(54) VEHICLE DRIVING APPARATUS

(75) Inventors: Hirofumi Ota, Toyota (JP); Koichi Miyamoto, Nagoya (JP); Toshiya Yamashita, Toyota (JP); Shingo Eto, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 811 days.

This patent is subject to a terminal disclaimer.

(21) Appl. No.: 12/922,059

(22) PCT Filed: Feb. 6, 2009

(86) PCT No.: PCT/JP2009/052112
§ 371 (c)(1),
(2), (4) Date: Sep. 10, 2010

(87) PCT Pub. No.: WO2009/113348
PCT Pub. Date: Sep. 17, 2009

(65) Prior Publication Data
US 2011/0005215 A1    Jan. 13, 2011

(30) Foreign Application Priority Data
Mar. 13, 2008 (JP) ................. 2008-064386

(51) Int. Cl.
*F16D 33/00* (2006.01)
(52) U.S. Cl.
USPC ................. 60/345; 60/352; 60/362
(58) Field of Classification Search
USPC .............. 60/341, 345, 347, 352, 361, 362
See application file for complete search history.

(56) References Cited

U.S. PATENT DOCUMENTS

| 3,886,729 | A | 6/1975 | Amann et al. |
|---|---|---|---|
| 5,415,603 | A | 5/1995 | Tuzuki et al. |
| 6,050,375 | A | 4/2000 | Gradu et al. |
| 7,016,773 | B2 | 3/2006 | Kuroda et al. |
| 7,676,313 | B2 | 3/2010 | Ortmann et al. |
| 2011/0010063 | A1 * | 1/2011 | Ota et al. ............ 60/352 |

FOREIGN PATENT DOCUMENTS

| JP | 50-50509 A | 5/1975 |
|---|---|---|
| JP | 57-44252 U | 3/1982 |
| JP | 01-169170 A | 7/1989 |
| JP | 2-145353 U | 12/1990 |
| JP | 10-339363 A | 12/1998 |

OTHER PUBLICATIONS

United States Office Action dated May 30, 2012, for U.S. Appl. No. 12/922,009.
United States Office Action dated Oct. 19, 2012, for U.S. Appl. No. 12/922,009.

* cited by examiner

*Primary Examiner* — Michael Leslie
(74) *Attorney, Agent, or Firm* — Sughrue Mion, PLLC

(57) ABSTRACT

A vehicle driving apparatus includes: a torque converter having a pump vane wheel, a turbine vane wheel, and a stator vane wheel, the stator vane wheel rotatably disposed between the turbine vane wheel and the pump vane wheel; an electric motor that drives the stator vane wheel; a 25 first connecting and disconnecting means capable of connecting and disconnecting the electric motor and the stator vane wheel to/from each other; and a second connecting and disconnecting means capable of connecting and disconnecting the electric motor and a output shaft to/from each other.

19 Claims, 9 Drawing Sheets

|  | Cs | Ci | Bs |
|---|---|---|---|
| T/M MODE |  |  | ◎ |
| T/C MODE | ○ |  |  |
| H/V MODE |  | ○ | ◎ |

|          | Cs | Ci | Bs |
|----------|----|----|----|
| T/M MODE 1 | ○ |    | ◎ |
| T/M MODE 2 | ◎ |    | ○ |
| H/V MODE   | ◎ | ○  | ○ |
| T/C MODE   | ○ | ○  |    |

|   | C1 | C2 | C3 | C4 | B1 | B2 | F1 |
|---|---|---|---|---|---|---|---|
| P |   |   |   |   |   |   |   |
| Rev1 |   |   | ○ |   |   | ○ |   |
| Rev2 |   |   |   | ○ |   | ○ |   |
| N |   |   |   |   |   |   |   |
| 1st | ○ |   |   |   |   | (○) | ○ |
| 2nd | ○ |   |   |   | ○ |   |   |
| 3rd | ○ |   | ○ |   |   |   |   |
| 4th | ○ |   |   | ○ |   |   |   |
| 5th | ○ | ○ |   |   |   |   |   |
| 6th |   | ○ |   | ○ |   |   |   |
| 7th |   | ○ | ○ |   |   |   |   |
| 8th |   | ○ |   |   | ○ |   |   |

○ : ENGAGEMENT  (○) : ENGAGEMENT DURING ENGINE BRAKING

VEHICLE DRIVING APPARATUS

TECHNICAL FIELD

The present invention relates to a vehicle driving apparatus having a torque converter capable of amplifying torque through a fluid, and, more particularly, to a vehicle driving apparatus having a torque converter capable of varying the torque amplification factor using an electric motor.

BACKGROUND ART

A torque converter is well known that has a pump vane wheel, a turbine vane wheel, and a stator vane wheel rotatably disposed between the turbine vane wheel and the pump vane wheel. In such a conventional torque converter, the stator vane wheel is coupled to a non-rotating member through a one-way clutch and the torque converter has no variable displacement property. Generally, it is desired that the fluid property of a torque converter shows a high displacement (displacement coefficient) when the torque converter is fuel-efficiency oriented. However, in the conventional structure, the fluid property is univocally determined by the shapes of the pump vane wheel, the turbine vane wheel, and the stator vane wheel and, therefore, the fluid property becomes same regardless of running pattern and simultaneous improvement of the fuel efficiency performance and the motive power performance is limited.

Whereas, as described in Patent Document 1, a variable-displacement torque converter has been proposed that includes a braking means disposed between a stator vane wheel and a non-rotating member and whose displacement is varied by adjusting the braking torque of the braking means. According to this, continuous- or multi-step variation of each of the torque ratio and the displacement coefficient of the torque converter is enabled by adjusting the braking torque using the braking means. Therefore the optimal torque ratio and the optimal displacement coefficient can be set corresponding to driving conditions and running conditions. Therefore, the running performance of a vehicle can be improved.

Patent Document 1: Japanese Laid-Open Patent Publication No. 1-169170

DISCLOSURE OF THE INVENTION

Problem to be Solved by the Invention

In the conventional variable-displacement torque converter, however, the rotation of its stator vane wheel is only controlled within the range in a negative rotation direction that is the opposite of the rotation direction of the pump vane wheel and, therefore, the upper limit of the torque ratio and the lower limit value of the displacement coefficient obtained therefrom are limited. Therefore, the torque ratio of the torque converter can not always sufficiently be improved and the displacement coefficient can not always sufficiently be varied to a lower value, corresponding to the driving conditions and the running conditions. Therefore, the motive power performance of a vehicle can not sufficiently be improved.

The present invention was conceived in view of the circumstances and the object thereof is to provide a vehicle driving apparatus having a variable-displacement torque converter capable of increasing its torque ratio and varying its displacement coefficient to a lower value and, thereby, sufficiently improving the motive power performance of a vehicle.

Means for Solving the Problem

After a series of various discussions in view of the circumstances, the inventor, etc., found that a higher torque ratio and a lower displacement coefficient than the conventional ones can be obtained when a stator vane wheel is actively driven in a positive rotation direction that is the rotation direction of a pump vane wheel using an electric motor that is a motive power source different from a driving source of a vehicle. Thereby, using the electric motor, the stator vane wheel is rotated (driving) in the positive rotation direction that is the rotation direction of the pump vane wheel, and is rotated (braking, regeneration) in a negative rotation direction that is the opposite of the rotation direction of the pump vane wheel and, thereby, a range of variation of each of the torque ratio and the displacement coefficient becomes wider than the conventional ones and, therefore, the fuel efficiency performance and the motive power performance of a vehicle can significantly be improved. The inventors, etc., also found a method of using the electric motor that is the motive power source to drive the stator vane wheel, for not only driving the stator vane wheel but also, when necessary, other uses such as, for example, a motive power source for running with a motor.

Effects of the Invention

The object indicated above is achieved in the first aspect of the present invention, which provides a vehicle driving apparatus including: (a) a torque converter having a pump vane wheel, a turbine vane wheel, and a stator vane wheel, the stator vane wheel rotatably disposed between the turbine vane wheel and the pump vane wheel; (b) an electric motor that drives the stator vane wheel; (c) a first connecting and disconnecting means capable of connecting and disconnecting the electric motor and the stator vane wheel to/from each other; and (d) a second connecting and disconnecting means capable of connecting and disconnecting the electric motor and a output shaft to/from each other.

The object indicated above is achieved in the second aspect of the present invention, which provides the vehicle driving apparatus of the first aspect of the invention, further including a third connecting and disconnecting means capable of connecting and disconnecting the stator vane wheel and a stationary member to/from each other.

The object indicated above is achieved in the third aspect of the present invention, which provides the vehicle driving apparatus of the first or second aspect of the invention, wherein the first connecting and disconnecting means is set to be in its connection state and the second connecting and disconnecting means is set to be in its disconnection state.

The object indicated above is achieved in the fourth aspect of the present invention, which provides the vehicle driving apparatus of the first or second aspect of the invention, wherein the first connecting and disconnecting means is set to be in its disconnection state and the second connecting and disconnecting means is set to be in its connection state.

The object indicated above is achieved in the fifth aspect of the present invention, which provides the vehicle driving apparatus of the first or second aspect of the invention, wherein the first and the second connecting and disconnecting means are set to be in their disconnection states.

The object indicated above is achieved in the sixth aspect of the present invention, which provides the vehicle driving apparatus of the fifth aspect of the invention, wherein the third connecting and disconnecting means is further set to be in its connection state.

The object indicated above is achieved in the seventh aspect of the present invention, which provides the vehicle driving apparatus of any one of the first to sixth aspects of the invention, wherein the electric motor is coupled to an electric oil pump.

The object indicated above is achieved in the eighth aspect of the present invention, which provides the vehicle driving apparatus of claim 1, wherein (a) a planetary gear set is attached between the electric motor and the torque converter, wherein (b) the vehicle driving apparatus further comprises a third connecting and disconnecting means capable of connecting and disconnecting a predetermined rotating element of the planetary gear set and a stationary member to/from each other, wherein (c) representing three rotating elements of the planetary gear set as a first, a second, and a third rotating elements, (d) the first rotating element is selectively coupled to the stator vane wheel through the first connecting and disconnecting means and is selectively coupled to the stationary member through the third connecting and disconnecting means, wherein (e) the second rotating element is selectively coupled to the output shaft through the second connecting and disconnecting means, and wherein (f) the third rotating element is coupled to the electric motor.

The object indicated above is achieved in the ninth aspect of the present invention, which provides the vehicle driving apparatus of the eighth aspect of the invention, wherein the second and the third connecting and disconnecting means are set to be in their connection states.

The object indicated above is achieved in the tenth aspect of the present invention, which provides the vehicle driving apparatus of the ninth aspect of the invention, wherein the first connecting and disconnecting means is set to be in its connection states.

The object indicated above is achieved in the eleventh aspect of the present invention, which provides the vehicle driving apparatus of the eighth aspect of the invention, wherein the first and the second connecting and disconnecting means are set to be in their connection states and the third connecting and disconnecting means is set to be in its disconnection state.

The object indicated above is achieved in the twelfth aspect of the present invention, which provides the vehicle driving apparatus of the eighth aspect of the invention, wherein the first and the third connecting and disconnecting means are set to be in their connection states and the second connecting and disconnecting means is set to be in its disconnection state.

The object indicated above is achieved in the thirteenth aspect of the present invention, which provides the vehicle driving apparatus of any one of the eighth to twelfth aspects of the invention, wherein the third rotating element is coupled to an electric oil pump.

The object indicated above is achieved in the fourteenth aspect of the present invention, which provides the vehicle driving apparatus of any one of the eighth to thirteenth aspects of the invention, wherein the first rotating element is a sun gear, wherein the second rotating element is a carrier, and wherein the third rotating element is a ring gear.

The object indicated above is achieved in the fifteenth aspect of the present invention, which provides the vehicle driving apparatus of any one of the eighth to thirteenth aspects of the invention, wherein the first rotating element is a carrier, wherein the second rotating element is a sun gear, and wherein the third rotating element is a ring gear.

The object indicated above is achieved in the sixteenth aspect of the present invention, which provides the vehicle driving apparatus of any one of the eighth to thirteenth aspects of the invention, wherein the first rotating element is a ring gear, wherein the second rotating element is a carrier, and wherein the third rotating element is a sun gear.

The object indicated above is achieved in the seventeenth aspect of the present invention, which provides the vehicle driving apparatus of any one of the eighth to thirteenth aspects of the invention, wherein the first rotating element is a sun gear, wherein the second rotating element is a ring gear, and wherein the third rotating element is a carrier.

The object indicated above is achieved in the eighteenth aspect of the present invention, which provides the vehicle driving apparatus of any one of the eighth to thirteenth aspects of the invention, wherein the first rotating element is a ring gear, wherein the second rotating element is a sun gear, and wherein the third rotating element is a carrier.

The object indicated above is achieved in the nineteenth aspect of the present invention, which provides the vehicle driving apparatus of any one of the eighth to thirteenth aspects of the invention, wherein the first rotating element is a carrier, wherein the second rotating element is a ring gear, and wherein the third rotating element is a sun gear.

Effect of the Invention

According to the first aspect of the invention, the vehicle driving apparatus includes: the torque converter having the pump vane wheel, the turbine vane wheel, and the stator vane wheel rotatably disposed between the turbine vane wheel and the pump vane wheel; and the electric motor that drives the stator vane wheel. Therefore, using the electric motor, the stator vane wheel is rotated in the positive rotation direction that is the rotation direction of the pump vane wheel and the negative rotation direction that is the opposite of the rotation direction of the pump vane wheel and, thereby, the variation ranges of the torque ratio and the displacement coefficient are expanded compared to the conventional ones and, therefore, the fuel efficiency performance and the motive power performance of a vehicle can significantly be improved.

The vehicle driving apparatus includes the first connecting and disconnecting means that can connect and disconnect the electric motor and the stator vane wheel to/from each other, and the second connecting and disconnecting means that can connect and disconnect the electric motor and the output shaft to/from each other. Therefore, for example, by setting the first connecting and disconnecting means to be in its connection state, the electric motor and the stator vane wheel are motive-power-transmittably coupled to each other and, thereby, the electric motor can be caused to function as the motive power source of the variable displacement torque converter. For example, by setting the second connecting and disconnecting means to be in its connection state, the electric motor and the output shaft are motive-power-transmittably coupled to each other and, thereby, the electric motor can be caused to function as a motor for a hybrid vehicle. By properly setting the first connecting and disconnecting means and the second connecting and disconnecting means to be in their connection or disconnection states as described hereinabove, the one electric motor can be used switching between its variable-displacement torque converter function and its hybrid function. The vehicle driving apparatus having the variable-displacement torque converter function and the hybrid function can be configured to be light and compact.

According to the second aspect of the invention, the vehicle driving apparatus further includes the third connecting and disconnecting means that can connect and disconnect the stator vane wheel and the case to/from each other. Therefore, by setting the third connecting and disconnecting means to be in its connection state, the stator vane wheel can be rotated and stopped. Thereby, the torque converter can be caused to function as a torque converter similar to the conventional one for the stator vane wheel to be rotated and stopped by the one-way clutch. By connecting third connecting and disconnecting means during the connection state of the second connecting and disconnecting means, the hybrid function and the conventional torque converter function can be simultaneously established According to the third aspect of the invention, by setting the first connecting and disconnecting means to be in its connection state and the second connecting and disconnecting means to be in its disconnection state, the electric motor can be caused to independently function as the motive power source of the variable-displacement torque converter regardless of the rotation state of the output shaft.

According to the fourth aspect of the invention, by setting the first connecting and disconnecting means to be in its disconnection state and the second connecting and disconnecting means to be in its connection state, the electric motor can be caused to independently function as the motor for driving of the vehicle and regeneration regardless of the state of the torque converter.

According to the fifth aspect of the invention, by setting the first connecting and disconnecting means and the second connecting and disconnecting means in their disconnection state, the electric motor is disconnected from the stator vane wheel and the output shaft. Thereby, an influence by the electric motor occurring when no electric motor is necessary can be avoided.

According to the sixth aspect of the invention, by further setting the third connecting and disconnecting means to be in its connection state, the torque converter can have the function as a conventional torque converter without any unnecessary dragging by the electric motor.

According to the seventh aspect of the invention, the electric motor is coupled to the electric oil pump and, therefore, the electric motor can be caused to function as a motor to drive the electric oil pump and, thereby, the vehicle driving apparatus can be configured to be more compact.

According to the eighth aspect of the invention, the electric motor can be downsized by the torque conversion function of the planetary gear set. By properly operating the first connecting and disconnecting means and the second connecting and disconnecting means and the third connecting and disconnecting means, the three functions can be provided using the one electric motor switchingly functions as a driving and regenerating motor of the stator vane wheel and a driving and regenerating motor of the vehicle, and, furthermore, functions as a conventional torque converter.

According to the ninth aspect of the invention, by setting the second connecting and disconnecting means and the third connecting and disconnecting means to be in their connection states, the electric motor is motive-power-transmittably connected to the output shaft through the planetary gear set and, therefore, driving and regenerating control by the electric motor is enabled. The torque is converted by the planetary gear set and, therefore, downsizing of the electric motor is also enabled. At this time, the first rotating element that is coupled to the stationary member by the third connecting and disconnecting means functions as a member that generates the counter force.

According to the tenth aspect of the invention, by further setting the first connecting and disconnecting means to be in its connection state in the state, the rotation of the stator vane wheel can properly be stopped even in the hybrid running state where the electric motor is motive-power-transmittably coupled to the output shaft. Therefore, the function as an ordinary torque converter can be provided.

According to the eleventh aspect of the invention, the first connecting and disconnecting means and the second connecting and disconnecting means are set to be in their connection states and the third connecting and disconnecting means is set to be in its disconnection state and, therefore, the stator vane wheel is motive-power-transmittably coupled to the electric motor through the planetary gear set. Thereby, control of the rotation velocity of the stator vane wheel by the electric motor is enabled and, therefore, running with a variable displacement of the torque converter is enabled. In this case, the second rotating element connected to the output shaft functions as a member that generates a counter force.

According to the twelfth aspect of the invention, the first connecting and disconnecting means and the third connecting and disconnecting means are set to be in their connection states and the second connecting and disconnecting means is set to be in its disconnection state and, therefore, the rotation of the stator vane wheel can properly be stopped. Therefore, the torque converter can be caused to have the same function as that of the conventional torque converter. By slipping-controlling at least one of the first connecting and disconnecting means and the third connecting and disconnecting means, the torque converter can be used as a variable-displacement torque converter.

According to the thirteenth aspect of the invention, the third rotating element is coupled to the electric oil pump and, therefore, the electric motor can be caused to function as a motor to drive the electric oil pump. Therefore, the vehicle driving apparatus can be configured to be more compact.

According to the fourteenth aspect of the invention, the planetary gear set is engaged as described above and, thereby, the torque conversion by the planetary gear set is enabled.

According to the fifteenth aspect of the invention, the planetary gear set is engaged as described above and, thereby, the torque conversion by the planetary gear set is enabled.

According to the sixteenth aspect of the invention, the planetary gear set is engaged as described above and, thereby, the torque conversion by the planetary gear set is enabled.

According to the seventeenth aspect of the invention, the planetary gear set is engaged as described above and, thereby, the torque conversion by the planetary gear set is enabled.

According to the eighteenth aspect of the invention, the planetary gear set is engaged as described above and, thereby, the torque conversion by the planetary gear set is enabled.

According to the nineteenth aspect of the invention, the planetary gear set is engaged as described above and, thereby, the torque conversion by the planetary gear set is enabled.

In the, preferably, the variable-displacement torque converter is applied to a vehicle that is provided with an engine such as an internal combustion engine as its driving source.

Preferably, the first to the third connecting and disconnecting means are hydraulic frictional engaging elements that each are driven by a hydraulic system. By adapting as described hereinabove, the connection state of each of the first to the third connecting and disconnecting means can properly be controlled by controlling the hydraulic systems. The "connection state" includes not only the state where the hydraulic frictional engaging element is completely engaged but also its slipping-engagement state.

EXPLANATIONS OF LETTERS OR NUMERALS

Best Modes for Carrying Out the Invention

Embodiments of the present invention will be described in detail with reference to the accompanying drawings. In the embodiments, the drawings are properly simplified or modified and are not always accurately depicted in respect of dimension ratios, shapes, etc., of portions.

First Embodiment

Figure 1:
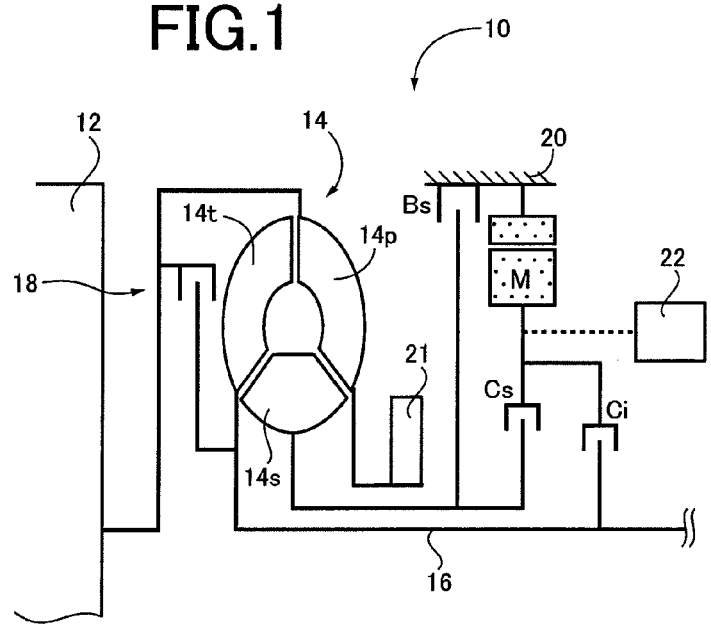
FIG. 1 is a schematic diagram for explaining a portion of a vehicle driving apparatus that is an embodiment of the present invention.

FIG. 1 is a schematic diagram for explaining a portion of a vehicle driving apparatus 10 that is an embodiment of the present invention. In the vehicle driving apparatus 10, an output of an engine 12 configured by an internal combustion engine is transmitted to an output shaft 16 through a torque converter 14, and is transmitted to a right and a left driving wheels through a transmission not depicted, a differential gear apparatus (final reduction gear), a pair of wheels, etc.

The torque converter 14 includes: a pump vane wheel 14$p$ that is coupled to a crank shaft of the engine 12 and that generates a fluid flow using a flow of a hydraulic oil in the torque converter 14 by being driven and rotated by the engine 12; a turbine vane wheel 14$t$ that is coupled to an output shaft 16 and that is rotated receiving the fluid flow from the pump vane wheel 14$p$; and a stator 14$s$ that is rotatably disposed between fluid flows between the turbine vane wheel 14$t$ and the pump vane wheel 14-$p$, and the torque converter 14 is adapted to transmit the motive power through the hydraulic oil.

A locking-up clutch 18 is disposed between the pump vane wheel 14$p$ and the turbine vane wheel 14$t$. An engagement state, a slipping-engagement state, or a release state of the locking-up clutch 18 is controlled by a hydraulic control circuit not depicted. For example, when the locking-up clutch 18 is set in its complete engagement state, the pump vane wheel 14$p$ and the turbine vane wheel 14$t$ are jointly rotated. The crank shaft of the engine 12 and the output shaft 16 are directly coupled to each other. The pump vane wheel 14$p$ is operably coupled to an oil pump 21 that is jointly operated with the pump vane wheel 14$p$, that is, the engine 12, and the oil pump 21 generates a main pressure of the hydraulic control circuit.

The vehicle driving apparatus 10 includes: an electric motor (electric motor) M to drive and rotate the stator vane wheel 14$s$; a clutch Cs capable of connecting and disconnecting the 20 electric motor M and the stator vane wheel 14$s$ to/from each other; a clutch Ci capable of connecting and disconnecting the electric motor M and the output shaft 16 to/from each other; and a brake Bs capable of connecting and disconnecting the stator vane wheel 14$s$ and a transmission case 20 (hereinafter, "case 20") that is a stationary member to/from each other. The electric motor M is operably coupled to an electric oil pump 22 and causes the electric oil pump 22 to operate to generates a predetermined hydraulic pressure when, for example, the engine 12 is stopped. The electric motor M of the embodiment corresponds to an electric motor of the present.

The clutches Cs and Ci and the brake Bs are multiple-disc hydraulic frictional engaging apparatuses that each are frictionally engaged or released by a hydraulic actuator and a hydraulic pressure supplied to the hydraulic actuator. The clutch Cs configures a first connecting and disconnecting means of the present invention that is capable of connecting and disconnecting the electric motor M and the stator vane wheel 14$s$ to/from each other. The clutch Ci configures a second connecting and disconnecting means of the present invention that is capable of connecting and disconnecting the electric motor M and the output shaft 16 to/from each other. The brake Bs configures a third connecting and disconnecting means of the present invention that is capable of connecting and disconnecting the stator vane wheel 14$s$ and a case 12 that is a stationary member to/from each other.

The electric motor M is a so-called motor generator having a driving and a regenerating functions. When the electric motor M is motive-power-transmittably coupled to the output shaft 16, driving and regeneration control by the electric motor M of the output shaft 16 is enabled. On the other hand, when the electric motor M is motive-power-transmittably coupled to the stator vane wheel 14s, variable displacement control by the electric motor M of the torque converter 14 is enabled.

Figure 2:
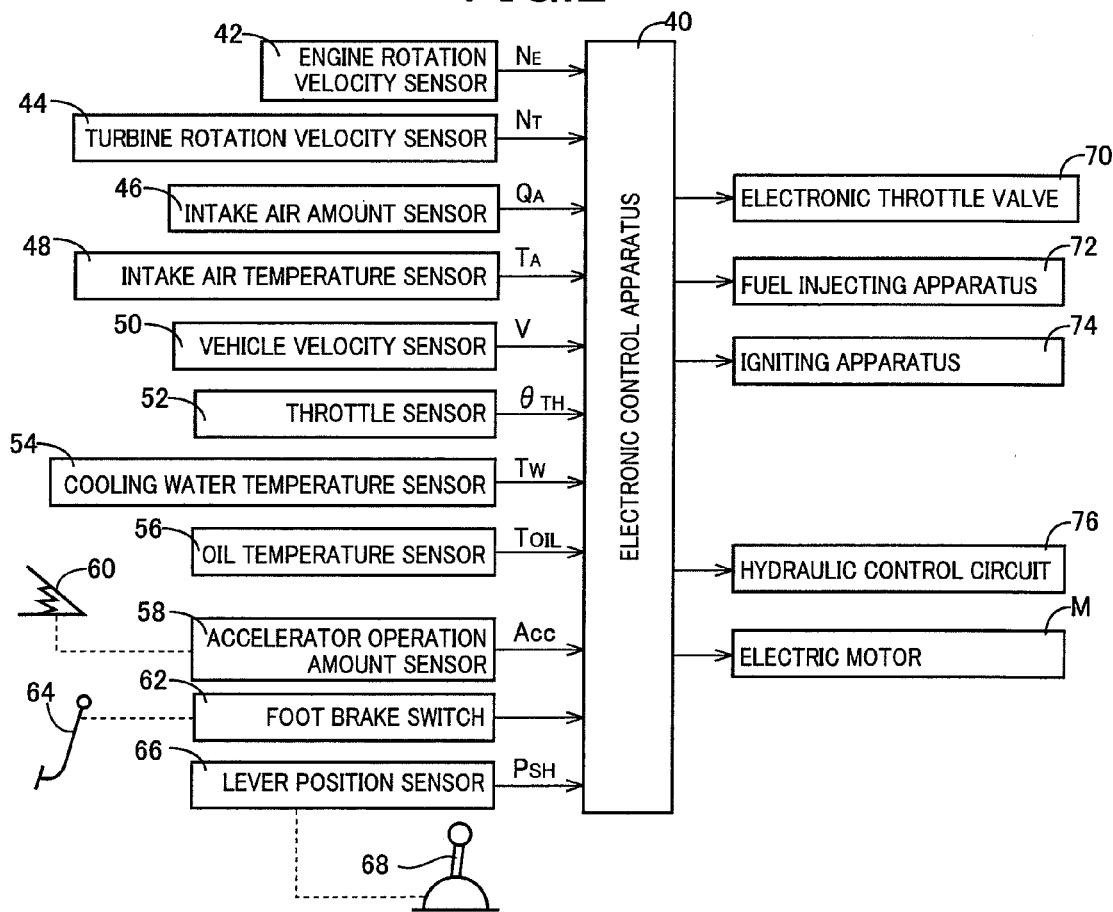
FIG. 2 is a block diagram for explaining a control system disposed in a vehicle to control an engine, a torque converter, etc., of FIG. 1.

FIG. 2 is a block diagram for explaining a control system provided for a vehicle to control the engine 12, the torque converter 14, etc., of FIG. 1. An electronic control apparatus 40 is adapted to be supplied with signals such as: a signal indicating an engine rotation velocity $N_E$ from an engine rotation velocity sensor 42; a signal indicating a turbine rotation velocity $N_T$, that is, an input shaft rotation velocity $N_{IN}$ from a turbine rotation velocity sensor 44; a signal indicating an intake air amount $Q_A$ from an intake air amount sensor 46; a signal indicating an intake air temperature $T_A$ from an intake air temperature sensor 48; a signal indicating a vehicle speed V, that is, an output shaft rotation velocity $N_{OUT}$ from a vehicle speed sensor 50: a signal indicating a throttle valve position $\theta_{TH}$ from a throttle sensor 52; a signal indicating a cooling water temperature $T_W$ from a cooling water temperature sensor 54; a signal indicating a hydraulic oil temperature $T_{OIL}$ of a hydraulic control circuit 76 from an oil temperature sensor 56; a signal indicating an operation amount $A_{CC}$ of an accelerator operating member such as an accelerator pedal 60 from an accelerator operation amount sensor 58; a signal indicating the presence or the absence of an operation of a foot brake 64 that is a regular brake from a foot brake switch 62; and a signal indicating a lever position (operation position) $P_{SH}$ of a shift lever 68 from a lever position sensor 66.

The electronic control apparatus 40 is configured including a so-called micro computer that includes a CPU, a RAM, a ROM, an input/output interface, etc. The CPU is adapted to use a temporary storage function of the RAM, process the input signals according to a program stored in advance in the ROM, and output signals, that is, output signals to an electronic throttle valve 70, linear solenoid valves of a fuel injecting apparatus 72, an igniting apparatus 74, and the hydraulic control circuit 76, etc., or the electric motor M, etc. The electronic control apparatus 40 is adapted to execute output control of the engine 12, speed variation control of a transmission not depicted, or rotation control of the stator vane wheel 14s of the torque converter 14, etc., by executing the input/output signal processing, and is configured, when necessary, being divided into those that are for the engine control, the speed variation control, etc. In the embodiment, the output control of the engine 12 is executed by the electronic throttle valve 70, the fuel injecting apparatus 72, the igniting apparatus 74, etc.

The driving and regeneration control of the output shaft 16 is executed by the clutch Ci and the electric motor M. When the clutch Ci is engaged, the electric motor M and the output shaft 16 are motive-power-transmittably coupled. For example, in a relatively-low-load running range, a low-vehicle-speed range, or during a vehicle starting stage in or during which the engine efficiency is generally said to be relatively low, the engine 12 is stopped and motor running (driving control) by the electric motor M is executed. For example, during inertia running (coast running) with the acceleration pedal not stepped on or braking by the foot brake, regeneration control is executed by which the electric motor M is driven and rotated to generate electric power by an opposite driving force transmitted from the output shaft 16.

The variable-displacement control of the torque converter 14 (more specifically, rotation control of the stator vane wheel 14s) is executed by the clutch Cs or the brake Bs of the hydraulic control circuit 76, or the electric motor M. More specifically, the rotation control of the stator vane wheel 14s is executed: by properly adjusting driving torque that is in proportion to the magnitude of a driving current supplied to the electric motor M from an inverter not depicted according to an order of the electronic control apparatus 40; or, for example, braking (regenerating) torque that is in proportion to the magnitude of a generated current output from the electric motor M. As described hereinabove, the stator vane wheel 14s not only is driven by the electric motor M but also functions as a driving source that causes the electric motor M to generate.

Figure 3:
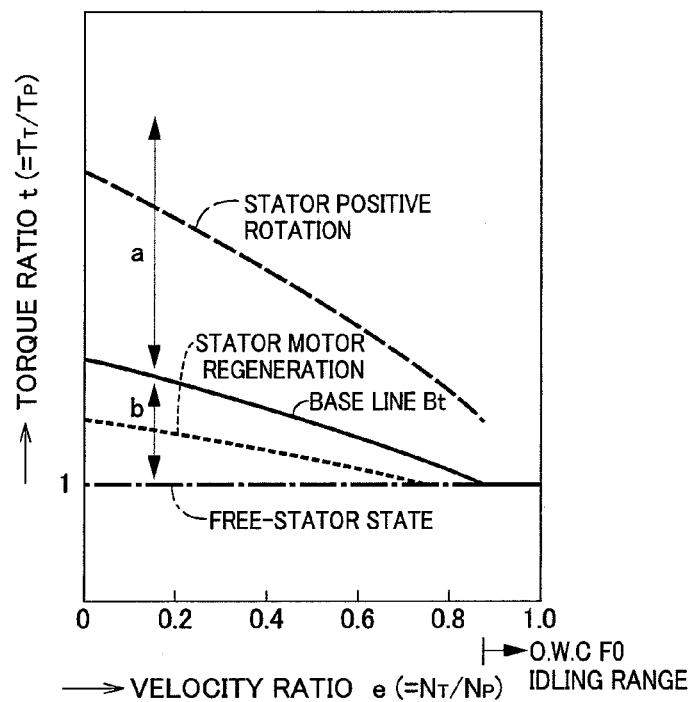
FIG. 3 is a graph of a property of the torque converter that is varied due to control by an electric motor of a rotation velocity of a stator vane wheel, and especially is a graph of a torque ratio.
Figure 4:
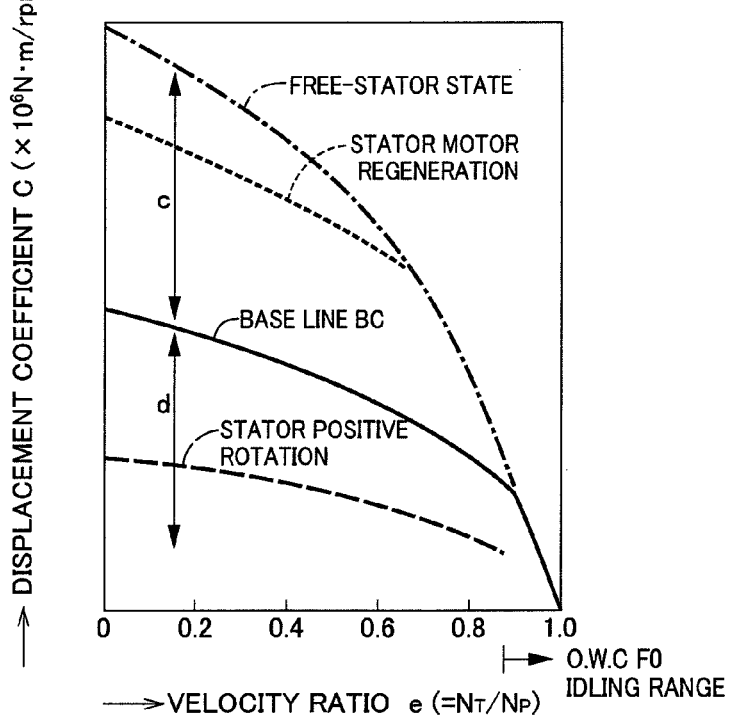
FIG. 4 is a graph of a property of the torque converter that is varied due to control by the electric motor of the rotation velocity of the stator vane wheel, and especially is a graph of a displacement coefficient.

FIGS. 3 and 4 are graphs of properties of the torque converter 14 that are varied due to control by the electric motor M of the rotation velocity of the stator vane wheel 14s. FIG. 3 is a graph of a torque ratio (torque amplification factor) $t\ (=T_T/T_P)$ of turbine torque $T_T$ and pump torque $T_P$ to a rotation velocity ratio of a turbine rotation velocity $N_T$ [rpm] of the turbine vane wheel 14t and a pump rotation velocity Np [rpm] of the pump vane wheel 14p, that is, a velocity ratio $e\ (=N_T/N_P)$. FIG. 4 is a graph of a displacement coefficient $C\ (=T_P/N_P^2)$ [N·m/rpm$^2$] to the velocity ratio $e\ (=N_T/N_P)$.

In FIGS. 3 and 4, the torque ratio t (baseline Bt) and the displacement coefficient C (baseline BC) each depicted using a solid line represent as references properties of a torque converter having a configuration of coupling a stator vane wheel to a one-way clutch, that is a conventional configuration.

In the case where the clutch Cs is properly engaged, when the stator vane wheel 14s is 15 rotated by the electric motor M in the same direction as that of the pump vane wheel 14p, stator torque is increased and the torque is transmitted at a higher torque ratio than that obtained by the conventional fixed-displacement torque converter, as represented by a dashed line that represents the case for stator positive rotations of FIG. 3. The displacement coefficient of the torque converter 14 in this case becomes that represented by a dashed line that represents the case for stator positive rotations of FIG. 4. Even with the same velocity ratio e, the torque ratio t and the displacement coefficient C are properly set respectively within a range from the baseline Bt to the dashed line representing the case for the stator positive rotations or higher of FIG. 3, and within a range from the baseline BC to the dashed line representing the case for the stator positive rotations or lower of FIG. 4 as indicated by arrows "a" and "d" of FIGS. 3 and 4, by a further increase or decrease of the driving torque caused by the electric motor M.

When the stator torque becomes zero due to the release of the clutch Cs and the brake Bs, the torque is not increased and the torque is transmitted at the torque ratio t that is t=1 as represented by a dot-and-dash line representing the case for the free-stator state of FIG. 3. As a result, the torque converter 14 operates as a fluid drive. The displacement coefficient C of the torque converter 14 in this case becomes that represented by a dot-and-dash line representing the case for the free-stator state of FIG. 4.

When the braking (regeneration) torque is adjusted to a predetermined value or an engaging pressure of the brake Bs is adjusted to a predetermined value and, thereby, the brake Bs is slipping-engaged, the stator torque is reduced compared to that of the case where the stator vane wheel 14s is fixed. Therefore, the torque is transmitted at a lower torque ratio t than that obtained by the conventional torque converter, as represented by a dotted line representing the case for stator motor regeneration of FIG. 3. The displacement coefficient C of the torque converter 14 in this case becomes that represented by a dotted line representing the case for the stator motor regeneration of FIG. 4. Even with the same velocity ratio e, the torque ratio t and the displacement coefficient C are properly set respectively within ranges from the baselines Bt and the baseline BC to the dot-and-dashed lines each representing the case for the free-stator state as indicated by arrows "b" and "c" of FIGS. 3 and 4, by a further increase or decrease of the braking torque or the engagement pressure of the brake Bs.

The electric motor M rotation-controls the stator vane wheel 14s to rotate in the positive rotation direction that is the rotation direction of the pump vane wheel 14p and, thereby, increases the torque ratio t. The electric motor M, using its braking (regeneration), rotation-controls the stator vane wheel 14s to rotate in the negative rotation direction that is the opposite of the rotation direction of the pump vane wheel 14p and, thereby, decreases the torque ratio t. The brake Bs, using its slipping, rotation-controls the stator vane wheel 14s to rotate in the negative rotation direction that is the opposite of the rotation direction of the pump vane wheel 14p and, thereby, decreases the torque ratio.

Figures 5, 6:
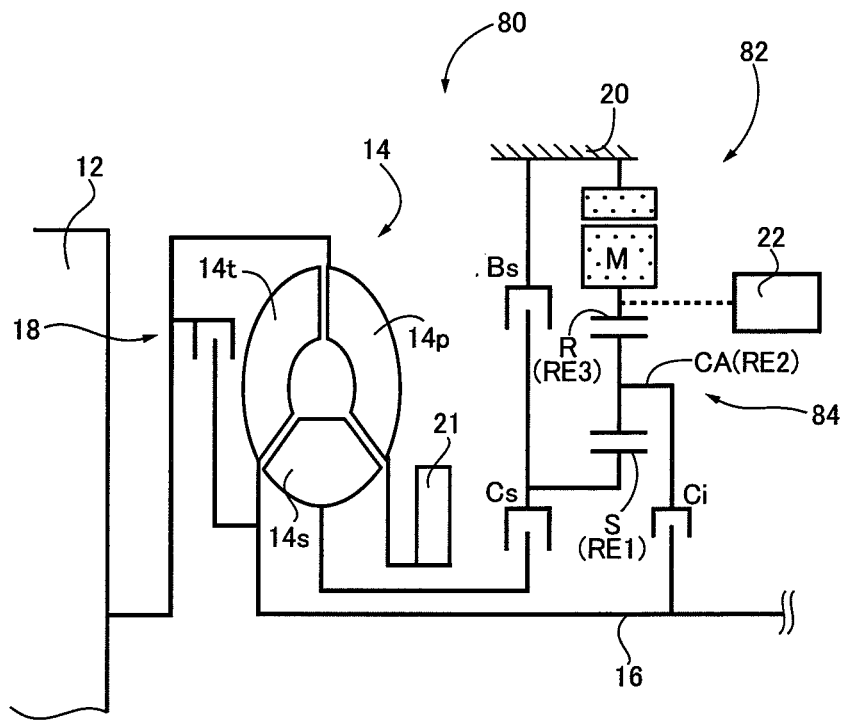
FIG. 5 is an engagement operation table of relations between engagement states of clutches and a brake, and operation modes of the vehicle driving apparatus based on the engagement states.
FIG. 6 is a schematic diagram for explaining a portion of a vehicle driving apparatus that is another embodiment of the present invention.

The vehicle driving apparatus 10 of the embodiment selectively connects and disconnects the clutches Cs and Ci and the brake Bs to/from each other and, thereby, causes: the driving and regeneration control by the electric motor M; and the variable displacement control or the operations as a conventional torque converter by the torque converter 14 to be executed. FIG. 5 is an engagement operation table of relations between engagement states of the clutches Cs and Ci and the brake Bs, and operation modes of the vehicle driving apparatus 10 based on the engagement states. In this table, "T/M mode" represents an aspect where the torque converter 14 is caused to operate as a torque converter similar to a conventional one, "T/C mode" represents an aspect where the torque converter 14 is caused to operate as a variable-displacement torque converter, and "H/V mode" represents an aspect where the driving and regeneration control of the vehicle by the electric motor M is executed. In FIG. 5, "○" (a circle) indicates the state where the clutch or the brake is always engaged (including the slipping-engagement), "⊚" (a double circle) indicates the state where the clutch or the brake is properly engaged or released, and an empty column indicates the state where the clutch or the brake is always released.

For example, when the clutches Cs and Ci are set to be in their release states (disconnection state) and the brake Bs is set to be in its proper engagement state (connection state) or in its release state (disconnection state), the mode becomes the T/M mode. When the clutches Cs and Ci are disconnected, the electric motor M becomes independent and an influence by the electric motor M on the output shaft 16 and the stator vane wheel 14s is eliminated. By setting the brake Bs to be in its engagement state, the rotation of the stator vane wheel 14s can be stopped. By properly engaging the brake Bs, the stator vane wheel 14s of the torque converter 14 can be caused to operate in the same aspect as that of the conventional torque converter stator. More specifically, for example, in a torque converter range of the torque converter 14, by engaging (connecting) the brake Bs, the flow of the hydraulic oil in the torque converter 14 is varied and, thereby, the torque is increased. In a coupling range, by releasing (disconnecting) the brake Bs, the stator vane wheel 14s is rotated in idle and, thereby, is caused to function as a fluid drive. The "engagement state" of the brake Bs includes not only the complete engagement state but also the slipping engagement state.

When the clutch Cs is engaged and the clutch Ci and the brake Bs are released, the mode becomes the T/C mode. The clutch Cs is engaged and, thereby, the electric motor M and the stator vane wheel 14s are motive-power-transmittably coupled to each other. Thereby, the rotation velocity of the stator vane wheel 14s can be controlled by the electric motor M and, by driving or braking (regeneration) the stator vane wheel 14s, the torque displacement of the torque converter 14 can properly be varied corresponding to the running state of the vehicle.

When the clutch Ci is engaged and the clutch Cs is released, the mode becomes the H/V mode. When the clutch Ci is engaged, the electric motor M and the output shaft 16 are motive-power-transmittably coupled to each other. Thereby, the output shaft 16 can be driven and rotated by the electric motor M, and the regeneration of the electric motor M by the driving force transmitted from the output shaft 16 is enabled. In this case, by properly engaging (connecting) or releasing (disconnecting) the brake Bs, the torque converter 14 can simultaneously have the same function as that of the conventional torque converter as in the T/M mode.

As described hereinabove, according to the embodiment, the vehicle driving apparatus 10 includes: the torque converter 14 having the pump vane wheel 14p, the turbine vane wheel 14t, and the stator vane wheel 14s rotatably disposed between the turbine vane wheel 14t and the pump vane wheel 14p; and the electric motor M that drives the stator vane wheel 14s. Therefore, using the electric motor M, the stator vane wheel 14s is rotated in the positive rotation direction that is the rotation direction of the pump vane wheel 14p and the negative rotation direction that is the opposite of the rotation direction of the pump vane wheel 14p and, thereby, the variation ranges of the torque ratio t and the displacement coefficient C are expanded compared to the conventional ones and, therefore, the fuel efficiency performance and the motive power performance of a vehicle can significantly be improved.

The vehicle driving apparatus includes the clutch Cs that can connect and disconnect the electric motor M and the stator vane wheel 14s to/from each other, and the clutch Ci that can connect and disconnect the electric motor M and the output shaft 16 to/from each other. Therefore, for example, by setting the clutch Cs to be in its connection state, the electric motor M and the stator vane wheel 14s are motive-power-transmittably coupled to each other and, thereby, the electric motor M can be caused to function as the motive power source of the variable displacement torque converter 14. For example, by setting the clutch Ci to be in its connection state, the electric motor M and the output shaft 16 are motive-power-transmittably coupled to each other and, thereby, the electric motor M can be caused to function as a motor for a hybrid vehicle. By properly setting the clutches Cs and Ci to be in their connection or disconnection states as described hereinabove, the one electric motor M can be used switching between its variable-displacement torque converter function and its hybrid function. The vehicle driving apparatus 10 having the variable-displacement torque converter function and the hybrid function can be configured to be light and compact.

According to the embodiment, the vehicle driving apparatus 10 further includes the brake Bs that can connect and disconnect the stator vane wheel 14s and the case 20 to/from each other. Therefore, by setting the brake Bs to be in its connection state, the stator vane wheel 14s can be rotated and stopped. Thereby, the torque converter 14 can be caused to function as a torque converter similar to the conventional one for the stator vane wheel 14s to be rotated and stopped by the one-way clutch. By connecting Bs during the connection state of Ci, the hybrid function and the conventional torque converter function can be simultaneously established.

According to the embodiment, by setting the clutch Cs to be in its connection state and the clutch Ci to be in its disconnection state, the electric motor M can be caused to independently function as the motive power source of the variable-displacement torque converter regardless of the rotation state of the output shaft 16.

According to the embodiment, by setting the clutch Cs to be in its release (disconnection) state and the clutch Ci to be in its connection (engagement) state, the electric motor M can be caused to independently function as the motor for driving of the vehicle and regeneration regardless of the state of the torque converter 14.

According to the embodiment, by setting the clutches Cs and Ci in their release (disconnection) state, the electric motor M is disconnected from the stator vane wheel 14s and the output shaft 16. Thereby, an influence by the electric motor M occurring when no electric motor is necessary can be avoided.

According to the embodiment, by further setting the brake Bs to be in its engagement (connection) state, the torque converter 14 can have the function as a conventional torque converter without any unnecessary dragging by the electric motor M. The one-way clutch included in the conventional torque converter can be omitted due to the brake Bs.

According to the embodiment, the electric motor M is coupled to the electric oil pump 22 and, therefore, the electric motor M can be caused to function as a motor to drive the electric oil pump and, thereby, the vehicle driving apparatus 10 can be configured to be more compact.

Another embodiment of the present invention will be described. In the following description, components thereof that are common to the embodiment are given the same reference numerals and letters and will not again be described.

Second Embodiment

FIG. 6 is a schematic diagram for explaining a portion of a vehicle driving apparatus 80 that is another embodiment of the present invention. The vehicle driving apparatus 80 of the embodiment includes a planetary gear set 84 that is attached between the electric motor M and the torque converter 14, in addition to the vehicle driving apparatus 10 of FIG. 1 described above. A differential mechanism 82 is configured by motive-power-transmittably coupling rotating elements of the planetary gear set 84 among each other.

In the differential mechanism 82, a sun gear S of the planetary gear set 84 is selectively coupled to the stator vane wheel 14s through the clutch Cs and is also selectively coupled to the case 12 through the brake Bs. A carrier CA of the planetary gear set 84 is selectively coupled to the output shaft 16 through the clutch Ci. A ring gear R of the planetary gear set 84 is coupled to the electric motor M. In the vehicle driving apparatus 80 of the embodiment, the sun gear S configures a first rotating element of the present invention, the carrier CA configures a second rotating element of the present invention, and the ring gear R configures a third rotating element of the present invention. In the embodiment, the clutch Cs also configures the first connecting and disconnecting means of the present invention, the clutch Ci also configures the second connecting and disconnecting means of the present invention, and the brake Bs configures the third connecting and disconnecting means of the present invention.

In the vehicle driving apparatus 80 configured as described hereinabove, similarly to the embodiment, by selectively connecting and disconnecting the clutches Cs and Ci and the brake Bs, the driving and regeneration control by the electric motor M and the variable displacement control and the operation as the conventional torque converter of the torque converter 14 can be caused to properly be executed.

Figures 7, 8:
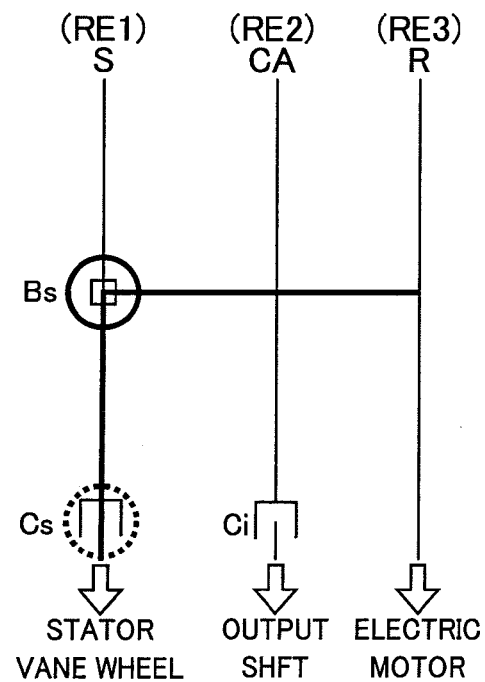
FIG. 7 is an engagement operation table of relations between engagement states of the clutches and the brake, and operation modes of the vehicle driving apparatus based on the engagement states, and is a table that corresponds to FIG. 5.
FIG. 8 is an example of a nomogram of a rotation state of a planetary gear set included in the vehicle driving apparatus.

FIG. 7 is an engagement operation table of relations between the engagement states of the clutches Cs and Ci and the brake Bs, and operation modes of the vehicle driving apparatus 80 based on the engagement states, and is a table that corresponds to FIG. 5.

For example, in the case where the clutch Cs is engaged and the clutch Ci is released, when the brake Bs is properly engaged (including slipping-engagement) or is released, the mode becomes the T/M mode. When the brake Bs is engaged, the rotation of the stator vane wheel 14s is stopped because the clutch Cs is engaged. By properly engaging or releasing the brake Bs in the state, the stator vane wheel 14s of the torque converter 14 can be caused to operate in the same aspect as that of a conventional torque converter stator. More specifically, for example, in the torque converter range of the torque converter 14, by engaging (connecting) the brake Bs, the flow of the hydraulic oil in the torque converter 14 is varied and, thereby, the torque is increased. In the coupling range, by releasing (disconnecting) the brake Bs, the stator vane wheel 14s is rotated in idle and, thereby, is caused to function as a fluid drive. When the brake Bs is always released, the torque converter 14 operates in the same aspect as that of a fluid drive.

In the case where the clutch Ci is released and the brake Bs is engaged when the clutch Cs is properly engaged (including slipping-engagement) or released, the mode becomes the T/M mode. When the clutch Cs is engaged, the rotation of the stator vane wheel 14s is stopped because the brake Bs is engaged. By properly engaging or releasing the clutch Cs in the state, the stator vane wheel 14s of the torque converter 14 can be caused to operate in the same aspect as that of the conventional torque converter stator. More specifically, for example, in the torque converter range of the torque converter 14, by engaging (connecting) the clutch Cs, the flow of the hydraulic oil in the torque converter 14 is varied and, thereby, the torque is increased. In the coupling range, by releasing (disconnecting) the clutch Cs, the stator vane wheel 14s is rotated in idle and, thereby, is caused to function as a fluid drive. When the clutch Cs is always released, the torque converter 14 operates in the same aspect as that of a fluid drive.

FIG. 8 is a nomogram of the rotation state of the planetary gear set 84 obtained when the clutch Cs is properly engaged or released in the case where the clutch Ci is released and the brake Bs is engaged. Three longitudinal lines of FIG. 8 correspond to, from the left, the sun gear S of the planetary gear set 84 configuring the first rotation element RE1, the carrier CA configuring the second rotating element RE2, and the ring gear R configuring the third rotating element RE3. When the brake Bs is engaged, the rotation velocity of the sun gear S becomes zero and, in this state, when Cs is further engaged, the rotation velocity of the stator vane wheel 14s becomes zero.

Referring back to FIG. 7, by setting the clutch Ci and the brake Bs to be in their engagement (connection) states, the electric motor M is motive-power-transmittably connected to the output shaft 16 through the planetary gear set 84 (H/V mode). Thereby, the output shaft 16 can be driven and rotated by the electric motor M and the regeneration by the electric motor M is enabled by the driving force transmitted from the output shaft 16. In the state, by setting the clutch Cs to be in its proper engagement state (connection state), the rotation of the stator vane wheel 14s is properly stopped and, therefore, the torque converter 14 can be operated in the same aspect as that of the conventional torque converter stator, maintaining the hybrid function. In the H/V mode, operation in the T/M mode can simultaneously be established.

Figure 9:
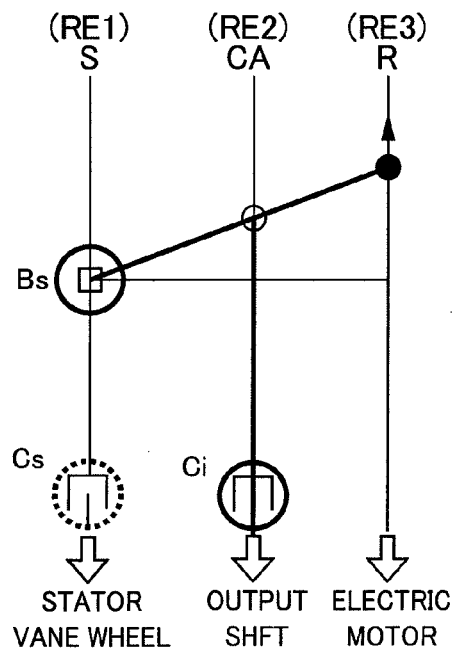
FIG. 9 is another example of the nomogram of the rotation state of the planetary gear set included in the vehicle driving apparatus.

FIG. 9 is an example of the nomogram of the rotation state of the planetary gear set 84 obtained when the clutch Ci and the brake Bs are engaged and the clutch Cs is properly engaged or released, and is a nomogram that corresponds to FIG. 8. When the brake Bs is engaged, the rotation velocity of the sun gear S is fixed at zero. In this state, when the electric motor M is rotated in the positive rotation direction, the velocity of the rotation of the carrier CA is reduced to a velocity lower than that of the rotation of the electric motor M and an output is output to the output shaft 16. In the embodiment, the planetary gear set 84 functions as a torque varying mechanism that varies output torque of the electric motor M. By engaging the brake Bs, the sun gear S functions as a counter-force generating element. During the regeneration, motive power is transmitted from the output shaft 16 and, thereby, the velocity of the rotation of the carrier CA is increased through the planetary gear set 84 and this rotation is transmitted to the ring gear R. Thereby, the electric motor M that is coupled to the ring gear R is rotated and generates. In this case, when the clutch Cs is engaged, the rotation of the stator vane wheel 14s is stopped because the rotation velocity of the sun gear S is zero. Thereby, by properly engaging the clutch Cs, the torque converter 14 can also be operated in the same aspect as that of the conventional torque converter stator.

Referring back to FIG. 7, by setting the clutches Cs and Ci to be in their engagement (connection) states, the torque converter 14 can be caused to operate as in the T/C mode according to which the displacement of the torque converter 14 is variable. When the clutch Cs is engaged, the electric motor M and the stator vane wheel 14s are motive-power-transmittably coupled through the planetary gear set 84. When the clutch Ci is engaged, the output shaft 16 and the carrier CA are coupled and, therefore, the carrier CA functions as a counter-force generating member. Because the output shaft 16 is coupled to the wheels of the vehicle through the transmission, etc., the output shaft 16 has high inertia (inertial force) against other rotating elements and, therefore, can be caused to function as the counter-force generating member. Thereby, using the output shaft 16 as the counter force reference, control by the electric motor M of the rotation velocity of the stator vane wheel 14s is enabled and, therefore, a torque converter 14 can be caused to function as a variable-displacement torque converter.

By setting the clutches Cs and Ci to be in their engagement states (connection states), the output of the electric motor M can simultaneously be output to the stator vane wheel 14s and the output shaft 16. The driving force is simultaneously transmitted from the stator vane wheel 14s and the output shaft 16 to the electric motor M and, thereby, regeneration is also enabled.

Figure 10:
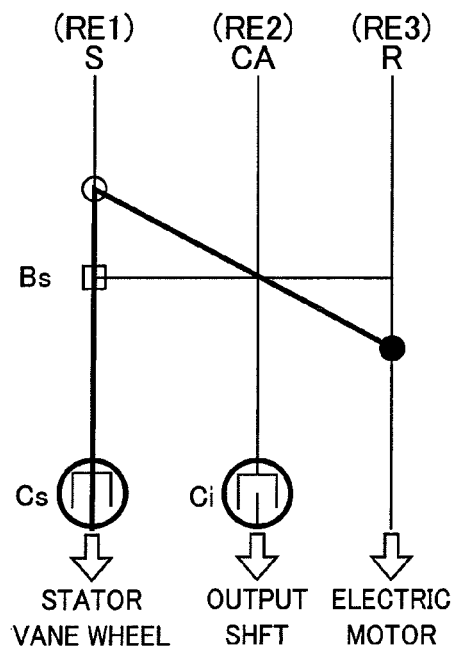
FIG. 10 is an example of a nomogram of the rotation state of the planetary gear set included in the vehicle driving apparatus.

FIG. 10 is an example of a nomogram of the rotation state of the planetary gear set 84 obtained when the clutches Cs and Ci are engaged (connected). FIG. 10 depicts the state where the vehicle is stopped, that is, where the rotation of the output shaft 16 (carrier CA) is stopped. When the electric motor M is rotated in the negative rotation direction, the stator vane wheel 14s is rotated in the positive rotation direction due to the differential action of the planetary gear set 84. Thereby, the torque ratio t (torque amplification factor) of the torque converter 14 is increased and the displacement coefficient C is reduced. Thereby, the load on the engine 12 is reduced.

Figure 11:
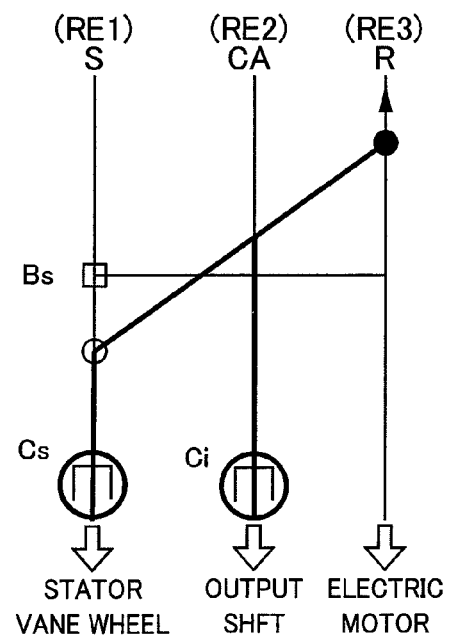
FIG. 11 is an example of a nomogram of the rotation state of the planetary gear set included in the vehicle driving apparatus.

FIG. 11 is an example of a nomogram of the rotation state of the planetary gear set 84 obtained when the clutches Cs and Ci are engaged (connected). FIG. 11 depicts the state where the vehicle is running, that is, where the output shaft 16 (carrier CA) is rotated. While the vehicle is running, when the electric motor M is rotated in the positive rotation direction, the stator vane wheel 14s is rotated in the negative rotation direction due to the differential action of the planetary gear set 84. Thereby, the torque ratio t (torque amplification factor) is reduced and the displacement coefficient C is increased. This state is realized when, for example, the vehicle is in the coupling range, and the same effect can be obtained as that of the case where the stator vane wheel 14s is rotated in idle. Otherwise, the electric motor M is rotated in the positive rotation direction using as a driving source the output of the stator vane wheel 14s that is rotated in the negative rotation direction associated with the flow of the hydraulic oil in the torque converter 14. Thereby, regeneration control using the electric motor M as a generator can be executed.

As described hereinabove, according to the embodiment, the electric motor M can be downsized by the torque conversion function of the planetary gear set 84. By properly operating the clutches Cs and Ci and the brake Bs, the three functions can be provided using the one electric motor M that are: the function as a driving and regenerating motor of the stator vane wheel 14s, that is, the function as the variable-displacement torque converter 14; the function as a driving and regenerating motor of the vehicle; and the function as a conventional torque converter.

According to the embodiment, by setting the clutch Ci and the brake Bs to be in their connection states, the torque of the electric motor M can be torque-converted by the planetary gear set 84 and be output to the output shaft 16. At this time, the sun gear S that is coupled to the case 20 by the brake Bs functions as the counter-force generating member that generates the counter force. By further setting the clutch Cs to be in its connection state in the state, the rotation of the stator vane wheel 14s can properly be stopped even in the hybrid running state where the electric motor M is motive-power-transmittably coupled to the output shaft 16. Therefore, the function as an ordinary torque converter can be provided.

According to the embodiment, the clutches Cs and Ci are set to be in their connection states and the brake Bs is set to be in its disconnection state and, therefore, the stator vane wheel 14s is motive-power-transmittably coupled to the electric motor M through the planetary gear set 84 and the output shaft 16 is motive-power-transmittably couple to the electric motor M through the planetary gear set 84. Thereby, rotation velocity control is enabled of the stator vane wheel 14s using, as a counter-force generating member, the carrier CA that is coupled to the output shaft 16. By using the carrier CA as the counter-force generating member, further providing a brake, etc., can be avoided.

According to the embodiment, the clutch Cs and the brake Bs are set to be in their connection states and the clutch Ci is set to be in its disconnection state and, therefore, the rotation of the stator vane wheel 14s can properly be stopped. Therefore, the torque converter 14 can be caused to have the same function as that of the conventional torque converter. By slipping-controlling at least one of the clutch Cs and the brake Bs, the torque converter 14 can be used as a variable-displacement torque converter.

According to the embodiment, the ring gear R is coupled to the electric oil pump 22 and, therefore, the electric motor M can be caused to function as a motor to drive the electric oil pump. Therefore, the vehicle driving apparatus 80 can be configured to be more compact.

According to the embodiment, the differential mechanism 82 is configured as described hereinabove and, thereby, the torque conversion by the planetary gear set 84 is enabled.

Third Embodiment

Figure 12:
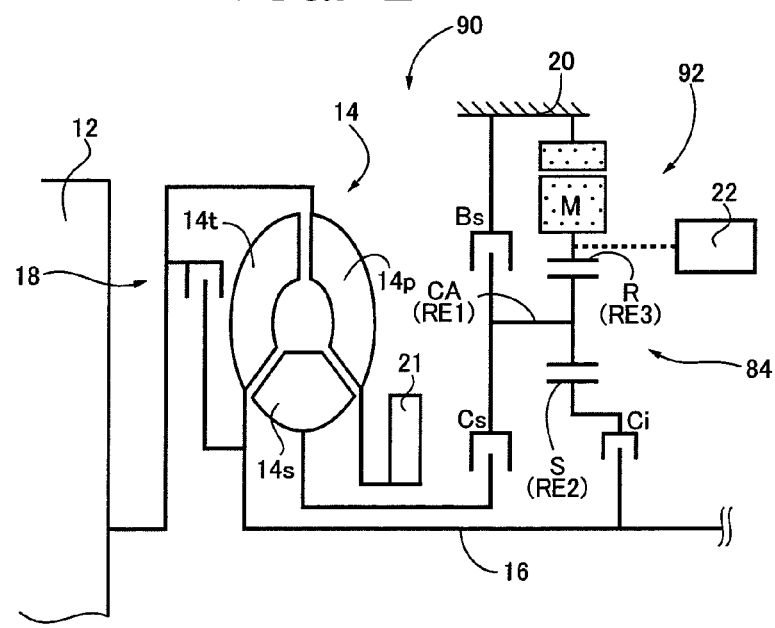
FIG. 12 is a schematic diagram for explaining a portion of a vehicle driving apparatus that is another embodiment of the present invention.

FIG. 12 is a schematic diagram for explaining a portion of a vehicle driving apparatus 90 that is another embodiment of the present invention. In the vehicle driving apparatus 90 of the embodiment, only the configuration of the differential mechanism 82 of the embodiment of FIG. 6 is different and, therefore, the configuration of a differential mechanism 92 of the embodiment will mainly be described.

In the differential mechanism 92, the sun gear S of the planetary gear set 84 is selectively coupled to the output shaft 16 through the clutch Ci. The carrier CA of the planetary gear set 84 is selectively coupled to the stator vane wheel 14s through the clutch Cs and is selectively coupled to the case 20 that is the stationary member through the brake Bs. The ring gear R of the planetary gear set 84 is coupled to the electric motor M. The electric oil pump 22 is operably coupled to the electric motor M. In the, in the vehicle driving apparatus 90 of the embodiment, the sun gear S configures the second rotating element RE2 of the present invention, the carrier CA configures the first rotating element RE1 of the present invention, and the ring gear R configures the third rotating element RE3 of the present invention.

In the vehicle driving apparatus 90 configured as described hereinabove, similarly to the embodiments, by selectively engaging the clutches Cs and Ci and the brake Bs based on the engagement operation table depicted in FIG. 7, the driving and regeneration control by the electric motor M (H/V mode), the variable displacement control of the torque converter 14 (T/C mode), and the operation as the conventional torque converter (T/M mode) can properly be executed. Each specific control is basically same as that of the embodiments and will not again be described. In this case, similarly to the embodiments, the planetary gear set 84 functions as the torque varying mechanism.

As described hereinabove, according to the embodiment, the differential mechanism 92 is configured as described hereinabove and, thereby, variation of the torque by the planetary gear set 84 is enabled and the same effects as those of the embodiments can be obtained.

Fourth Embodiment

Figure 13:
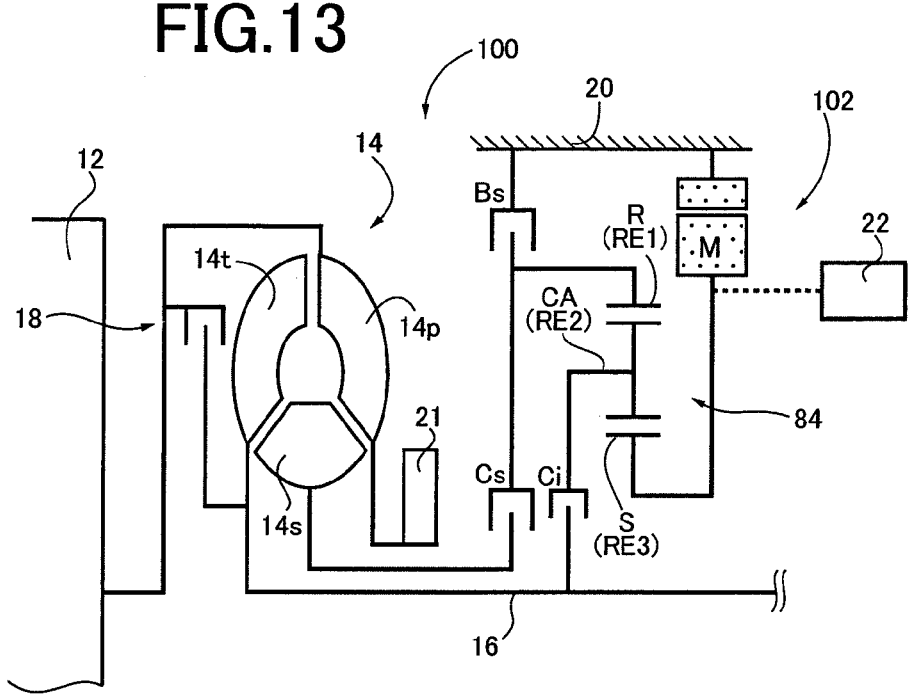
FIG. 13 is a schematic diagram for explaining a portion of a vehicle driving apparatus that is another embodiment of the present invention.

FIG. 13 is a schematic diagram for explaining a portion of a vehicle driving apparatus 100 that is another embodiment of the present invention. In the vehicle driving apparatus 100 of the embodiment, only the configuration of the differential mechanism 82 of the embodiment of FIG. 6 is different and, therefore, the configuration of a differential mechanism 102 of the embodiment will mainly be described.

In the differential mechanism 102, the sun gear S of the planetary gear set 84 is coupled to the electric motor M. The carrier CA of the planetary gear set 84 is selectively coupled to the output shaft 16 through the clutch Ci. The ring gear R of the planetary gear set 84 is selectively coupled to the stator vane wheel 14s through the cutch Cs and is selectively coupled to the case 20 that is the stationary member through the brake Bs. The electric oil pump 22 is operably coupled to the electric motor M. In the, in the vehicle driving apparatus 100 of the embodiment, the sun gear S configures the third rotating element RE3 of the present invention, the carrier CA configures the second rotating element RE2 of the present invention, and the ring gear R configures the first rotating element RE1 of the present invention.

In the vehicle driving apparatus 100 configured as described hereinabove, similarly to the embodiments, by selectively engaging the clutches Cs and Ci and the brake Bs based on the engagement operation table depicted in FIG. 7, the driving and regeneration control (H/V mode) by the electric motor M and the variable displacement control (T/C mode) and the operation as the conventional torque converter (T/M mode) of the torque converter 14 can properly be executed. Each specific control is basically same as that of the embodiments and, therefore, will not again be described. In this case, similarly to the embodiments, the planetary gear set 84 functions as the torque varying mechanism.

As described hereinabove, according to the embodiment, the differential mechanism 102 is configured as described hereinabove and, thereby, variation of the torque by the planetary gear set 84 is enabled and the same effects as those of the embodiments can be obtained.

Fifth Embodiment

Figure 14:
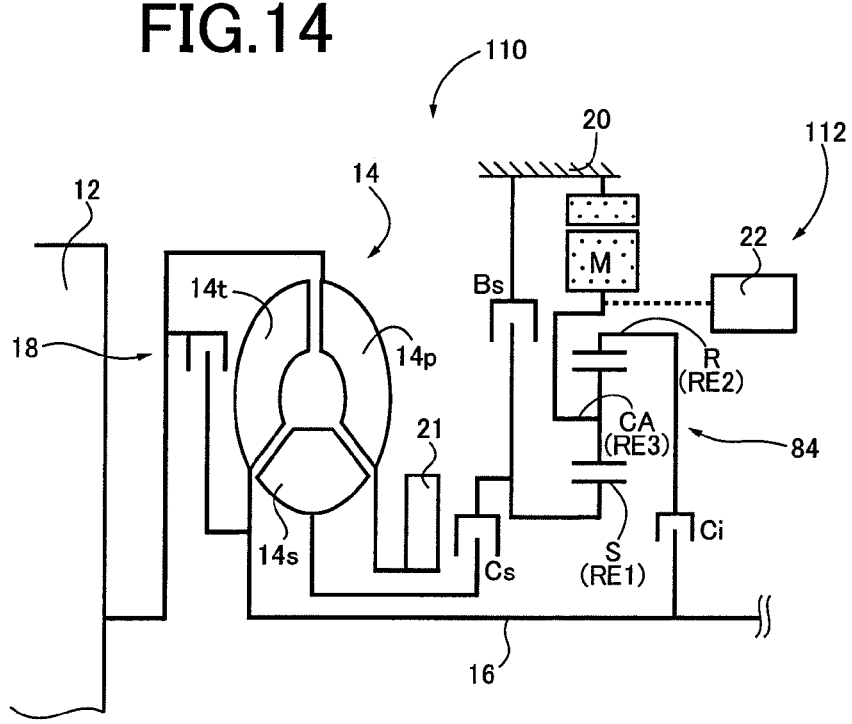
FIG. 14 is a schematic diagram for explaining a portion of a vehicle driving apparatus that is another embodiment of the present invention.

FIG. 14 is a schematic diagram for explaining a portion of a vehicle driving apparatus 110 that is another embodiment of the present invention. In the vehicle driving apparatus 110 of the embodiment, only the configuration of the differential mechanism 82 of the embodiment of FIG. 6 is different and, therefore, the configuration of a differential mechanism 112 of the embodiment will mainly be described.

In the differential mechanism 112 of the embodiment, the sun gear S of the planetary gear set 84 is selectively coupled to the stator vane wheel 14s through the clutch Cs and is selectively coupled to the case 20 that is the stationary member through the brake Bs. The carrier CA of the planetary gear set 84 is coupled to the electric motor M. The ring gear R of the planetary gear set 84 is selectively coupled to the output shaft 16 through the clutch Ci. The electric oil pump 22 is operably coupled to the electric motor M. In the, in the vehicle driving apparatus 110 of the embodiment, the sun gear S configures the first rotating element RE1 of the present invention, the carrier CA configures the third rotating element RE3 of the present invention, and the ring gear R configures the second rotating element RE2 of the present invention.

In the vehicle driving apparatus 110 configured as described hereinabove, similarly to the embodiments, by selectively engaging the clutches Cs and Ci and the brake Bs based on the engagement operation table depicted in FIG. 7, the driving and regeneration control (H/V mode) by the electric motor M and the variable displacement control (T/C mode) and the operation as the conventional torque converter (T/M mode) of the torque converter 14 can properly be executed. Each specific control is basically same as that of the embodiments and, therefore, will not again be described. In this case, similarly to the embodiments, the planetary gear set 84 functions as the torque varying mechanism.

As described hereinabove, according to the embodiment, the differential mechanism 112 is configured as described hereinabove and, thereby, variation of the torque by the planetary gear set 84 is enabled and the same effects as those of the embodiments can be obtained.

Sixth Embodiment

Figure 15:
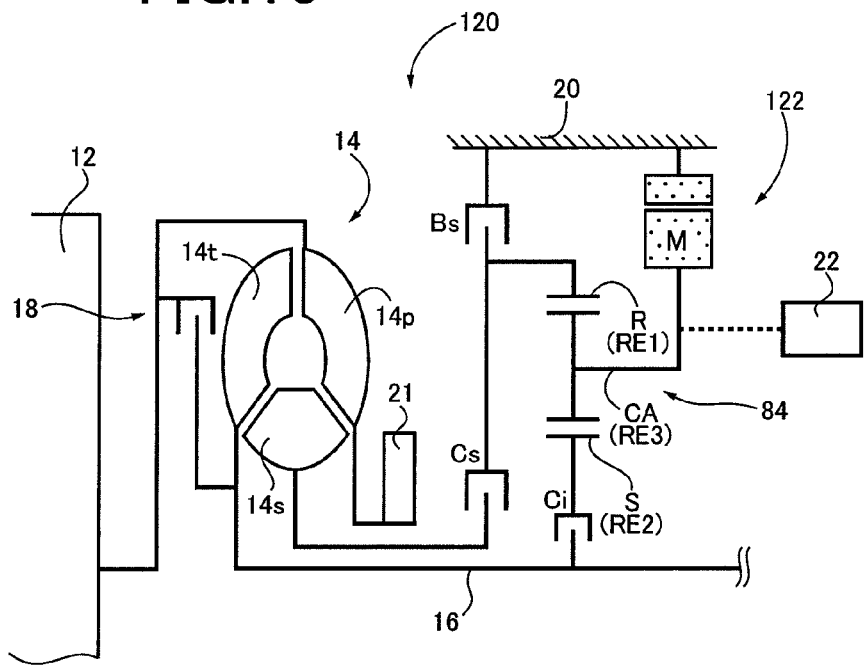
FIG. 15 is a schematic diagram for explaining a portion of a vehicle driving apparatus that is another embodiment of the present invention.

FIG. 15 is a schematic diagram for explaining a portion of a vehicle driving apparatus 120 that is another embodiment of the present invention. In the vehicle driving apparatus 120 of the embodiment, only coupling relations of the differential mechanism 82 of the embodiment of FIG. 6 are different and, therefore, the configuration of a differential mechanism 122 of the embodiment will mainly be described.

In the differential mechanism 122 of the embodiment, the sun gear S of the planetary gear set 84 is selectively coupled to the output shaft 16 through the clutch Ci. The carrier CA of the planetary gear set 84 is coupled to the electric motor M. The ring gear R of the planetary gear set 84 is selectively coupled to the stator vane wheel 14s through the clutch Cs and is selectively coupled to the case 20 that is the stationary member through the brake Bs. The electric oil pump 22 is operably coupled to the electric motor M. In the, in the vehicle driving apparatus 120 of the embodiment, the sun gear S configures the second rotating element RE2 of the present invention, the carrier CA configures the third rotating element RE3 of the present invention, and the ring gear R configures the first rotating element RE1 of the present invention.

In the vehicle driving apparatus 120 configured as described hereinabove, similarly to the embodiments, by selectively engaging the clutches Cs and Ci and the brake Bs based on the engagement operation table depicted in FIG. 7, the driving and regeneration control (H/V mode) by the electric motor M and the variable displacement control (T/C mode) and the operation as the conventional torque converter (T/M mode) of the torque converter 14 can properly be executed. Each specific control is basically same as that of the embodiments and, therefore, will not again be described. In this case, similarly to the embodiments, the planetary gear set 84 functions as the torque varying mechanism.

As described hereinabove, according to the embodiment, the differential mechanism 122 is configured as described hereinabove and, thereby, variation of the torque by the planetary gear set 84 is enabled and the same effects as those of the embodiments can be obtained.

Seventh Embodiment

Figure 16:
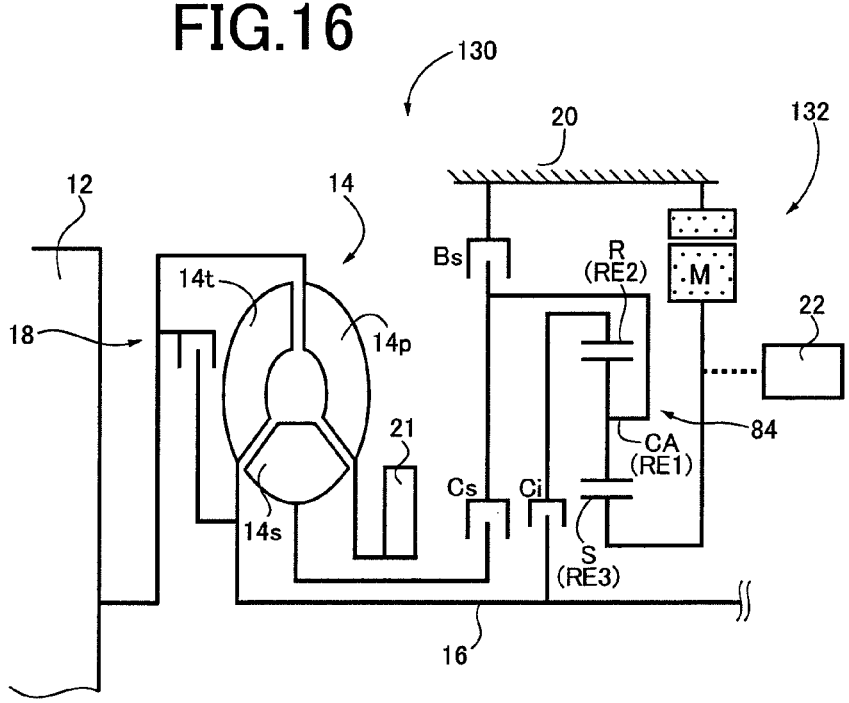
FIG. 16 is a schematic diagram for explaining a portion of a vehicle driving apparatus that is another embodiment of the present invention.

FIG. 16 is a schematic diagram for explaining a portion of a vehicle driving apparatus 130 that is another embodiment of the present invention. In the vehicle driving apparatus 130 of the embodiment, only the configuration of the differential mechanism 82 of the embodiment of FIG. 6 is different and, therefore, the configuration of a differential mechanism 132 of the embodiment will mainly be described.

In the differential mechanism 132, the sun gear S of the planetary gear set 84 is coupled to the electric motor M. The carrier CA of the planetary gear set 84 is selectively coupled to the stator vane wheel 14s through the clutch Cs and is selectively coupled to the case 20 that is the stationary member through the brake Bs. The ring gear R of the planetary gear set 84 is selectively coupled to the output shaft 16 through the clutch Ci. The electric oil pump 22 is operably coupled to the electric motor M. In the, in the vehicle driving apparatus 130 of the embodiment, the sun gear S configures the third rotating element RE3 of the present invention, the carrier CA configures the first rotating element RE1 of the present invention, and the ring gear R configures the second rotating element RE2 of the present invention.

In the vehicle driving apparatus 130 configured as described hereinabove, similarly to the embodiments, by selectively engaging the clutches Cs and Ci and the brake Bs based on the engagement operation table depicted in FIG. 7, the driving and regeneration control (H/V mode) by the electric motor M and the variable displacement control (T/C mode) and the operation as the conventional torque converter (T/M mode) of the torque converter 14 can properly be executed. Each specific control is basically same as that of the embodiments and, therefore, will not again be described. In this case, similarly to the embodiments, the planetary gear set 84 functions as the torque varying mechanism.

As described hereinabove, according to the embodiment, the differential mechanism 132 is configured as described hereinabove and, thereby, variation of the torque by the planetary gear set 84 is enabled and the same effects as those of the embodiments can be obtained.

Eighth Embodiment

Figures 17, 18:
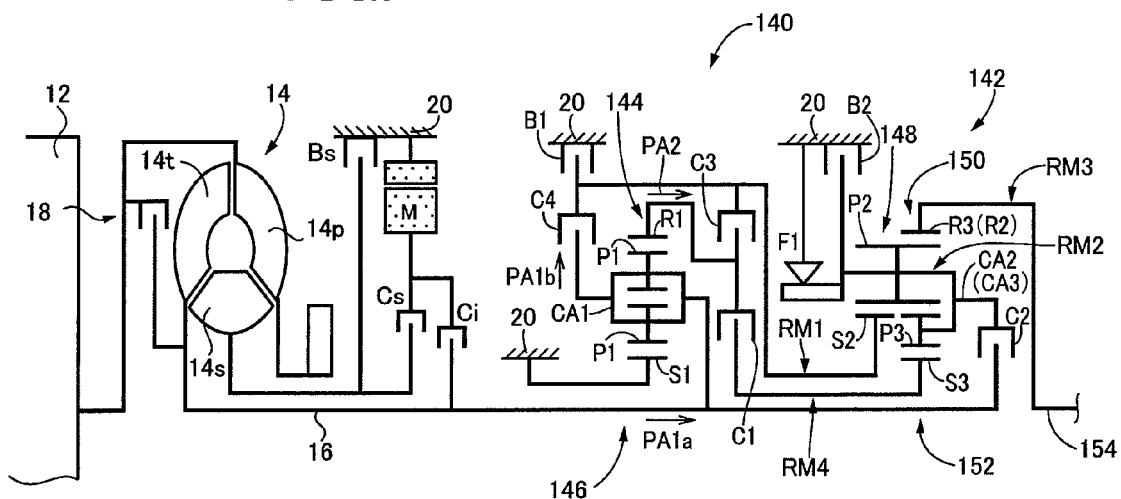
FIG. 17 is a schematic diagram for explaining a vehicle driving apparatus that is another embodiment of the present invention.
FIG. 18 is a chart for explaining an operation state of engagement elements for establishing each varied speed in an automatic transmission of FIG. 17.

FIG. 17 is a schematic diagram for explaining a portion of a vehicle driving apparatus 140 that is another embodiment of the present invention. The vehicle driving apparatus 140 of the embodiment is formed by combining the same configuration as that of the vehicle driving apparatus 10 of FIG. 1 with, in the latter stage thereof, a vertical-type automatic transmission 142. The configuration and control around the torque converter 14 are same as those of the embodiments and, therefore, will not again be described.

In the case 20 as the non-rotating member attached to the vehicle body, the automatic transmission 142 has on a common shaft center: a first gear shifting portion 146 that is mainly configured by a double-pinion first planetary gear set 144; and a second gear shifting portion 152 that is mainly configured by a single-pinion second planetary gear set 148 and a double-pinion third planetary gear set 150. The automatic transmission 142 varies the velocity of the rotation of the output shaft 16 of the torque converter 14 and outputs the rotation from an output shaft 154 of the automatic transmission 142. The torque converter 14 and the automatic transmission 142 are configured to be substantially symmetrical with respect to the shaft center. In the schematic diagram of FIG. 1, a lower half from the shaft center is omitted.

The first planetary gear set 144 includes a sun gear S1, a plural pairs of pinion gears P1 that engage each other, a carrier CA1 that supports the pinion gears P1 such that the pinion gears P1 can rotate and revolve, and a ring gear R1 that engages the sun gear S1 through the pinion gears P1. The second planetary gear set 148 includes a sun gear S2, pinion gears P2, a carrier CA2 that supports the pinion gears P2 such that the pinion gears P2 can rotate and revolve, and a ring gear R2 that engages the sun gear S2 through the pinion gears P2. The third planetary gear set 150 includes a sun gear S3, a plural pairs of pinion gears P2 and P3 that engage each other, a carrier CA3 that supports the pinion gears P2 and P3 such that the pinion gears P2 and P3 can rotate and revolve, and a ring gear R3 that engages the sun gear S3 through the pinion gears P2 and P3.

In FIG. 17, similarly to the clutches Cs and Ci and the brake Bs, clutches C1 to C4 and brakes B1 and B2 are hydraulic frictional engaging apparatuses each having a hydraulic actuator and a multiple-disc clutch or brake that is engaged or released by a hydraulic pressure supplied to the hydraulic actuator. The first rotating element RM1 (the sun gear S2) in the automatic transmission 142 is adapted to: be selectively coupled to the case 20 though the first brake B1; be rotated or stopped; be selectively coupled to the ring gear R1 (that is, a second intermediate output path PA2) of the first planetary gear set 144 that is an intermediate output member through a third clutch C3; and be further selectively coupled to the carrier CA1 (that is, an indirect path PA1*b* of a first intermediate output path PA1) of the first planetary gear set 144 through a fourth clutch C4.

A second rotating element RM2 (the carriers CA2 and CA3) in the automatic transmission 142 is adapted to: be selectively couple to the case 20 through the second brake B2; be rotated or stopped; and is selectively coupled to the output shaft 16 (that is, a direct path PA1*a* of the first intermediate output path PA1) through the second clutch C2. A third rotating element RM3 (the ring gears R2 and R3) is adapted to be jointly coupled to the output shaft 154 and to output the rotation. A fourth rotating element RM4 (the sun gear S3) is adapted to be coupled to the ring gear R1 through the first clutch C1. Between the second rotating element RM2 and the case 20, a one-way clutch F1 is disposed parallel to the second brake B2, that allows the positive rotation (the same rotation direction as that of the output shaft 16) of the second rotating element RM2 and prevents its reverse rotation.

FIG. 18 is a chart for explaining operation states of the engagement elements for establishing varied speeds in the automatic transmission 142. In FIG. 18, "○" (a circle) indicates an engagement state, "(○)" indicates an engagement state only during engine braking, and an empty column indicates a release state. As depicted in FIG. 18, the automatic transmission 142 of the embodiment is adapted to establish the plurality of varied speeds including eight forward speeds whose transmission gear ratios are different from each other by selectively engaging the engaging apparatuses, that is, the plurality of hydraulic frictional engaging apparatuses (the clutches C1 to C4 and the brakes B1 and B2). The transmission gear ratio of each of the varied speeds is properly determined by each of gear ratios ρ1, ρ2, and ρ3 of the first, the second, and the third planetary gear sets 144, 148, and 150.

As described hereinabove, even with the configuration formed by connecting, for example, the configuration similar to that of FIG. 1 to, for example, the step-variable automatic transmission 142, the effects of the present invention can advantageously be obtained by properly engaging the clutches Cs and Ci and the brake Bs corresponding to, for example, the condition, etc., of the automatic transmission 142.

The embodiments of the present invention have been described in detail with reference to the accompanying drawings. However, the present invention is applicable in other aspects.

For example, the vehicle driving apparatus 140 of the embodiment has the automatic transmission 142 connected to its latter stage. However, the present invention is applicable not only to the step-variable transmission such as the automatic transmission 144, but also to a vehicle driving apparatus to which a continuously-variable transmission such as a belt type continuously-variable transmission is connected.

In the embodiment, the vehicle driving apparatus 10 depicted in FIG. 1 is connected to the former stage of the automatic transmission 142. However, the present invention can also be applied by connecting a step-variable or a continuously-variable transmission to each of the embodiments such as a configuration having the automatic transmission 142 connected to the latter stage of, for example, the vehicle driving apparatus 80 depicted in FIG. 6.

In the embodiment, the planetary gear set 84 is the single-pinion planetary gear set. However, the planetary gear set 84 is not always limited to that of the single-pinion type and the present invention can also be carried out applying a double-pinion planetary gear set thereto.

In the embodiment, the output shaft 16 is caused to function as the counter force generating member and, thereby, the stator vane wheel 14s is driven by the electric motor M. However, the output shaft 16 does not need to always be caused to function as the counter force generating member and any configuration may be used that is adapted to generate a counter force by, for example, providing one more brake, etc.

The embodiment is configured to have no one-way clutch in the torque converter 14. However, the present invention is applicable to even a configuration having a one-way clutch.

It is to be understood that the are merely exemplary embodiments and that the present invention may be implemented in variously modified or altered manners based on the knowledge of those skilled in the art.

The invention claimed is:

1. A vehicle driving apparatus comprising:
a torque converter having a pump vane wheel, a turbine vane wheel, and a stator vane wheel, the stator vane wheel rotatably disposed between the turbine vane wheel and the pump vane wheel;
an electric motor that drives the stator vane wheel;
a first connecting and disconnecting means capable of connecting and disconnecting the electric motor and the stator vane wheel to/from each other; and
a second connecting and disconnecting means capable of connecting and disconnecting the electric motor and a output shaft to/from each other.

2. The vehicle driving apparatus of claim 1, further comprising
a third connecting and disconnecting means capable of connecting and disconnecting the stator vane wheel and a stationary member to/from each other.

3. The vehicle driving apparatus of claim 1, wherein the first connecting and disconnecting means is set to be in its connection state and the second connecting and disconnecting means is set to be in its disconnection state.

4. The vehicle driving apparatus of claim 1, wherein the first connecting and disconnecting means is set to be in its disconnection state and the second connecting and disconnecting means is set to be in its connection state.

5. The vehicle driving apparatus of claim 2, wherein the first and the second connecting and disconnecting means are set to be in their disconnection states.

6. The vehicle driving apparatus of claim 5, wherein the third connecting and disconnecting means is further set to be in its connection state.

7. The vehicle driving apparatus of claim 1, wherein the electric motor is coupled to an electric oil pump.

8. The vehicle driving apparatus of claim 1, wherein a planetary gear set is attached between the electric motor and the torque converter, wherein
the vehicle driving apparatus further comprises a third connecting and disconnecting means capable of connecting and disconnecting a predetermined rotating element of the planetary
gear set and a stationary member to/from each other, wherein
representing three rotating elements of the planetary gear set as a first, a second, and a third rotating elements, the first rotating element is selectively coupled to the stator vane wheel through the first connecting and disconnecting means and is selectively coupled to the stationary member
through the third connecting and disconnecting means, wherein
the second rotating element is selectively coupled to the output shaft through the second connecting and disconnecting means, and wherein
the third rotating element is coupled to the electric motor.

9. The vehicle driving apparatus of claim 8, wherein the second and the third connecting and disconnecting means are set to be in their connection states.

10. The vehicle driving apparatus of claim 9, wherein the first connecting and disconnecting means is set to be in its connection states.

11. The vehicle driving apparatus of claim 8, wherein the first and the second connecting and disconnecting means are set to be in their connection states and the third connecting and disconnecting means is set to be in its disconnection state.

12. The vehicle driving apparatus of claim 8, wherein the first and the third connecting and disconnecting means are set to be in their connection states and the second connecting and disconnecting means is set to be in its disconnection state.

13. The vehicle driving apparatus of claim 8, wherein the third rotating element is coupled to an electric oil pump.

14. The vehicle driving apparatus of claim 8, wherein the first rotating element is a sun gear, wherein the second rotating element is a carrier, and wherein the third rotating element is a ring gear.

15. The vehicle driving apparatus of claim 8, wherein the first rotating element is a carrier, wherein the second rotating element is a sun gear, and wherein the third rotating element is a ring gear.

16. The vehicle driving apparatus of claim 8, wherein the first rotating element is a ring gear, wherein the second rotating element is a carrier, and wherein the third rotating element is a sun gear.

17. The vehicle driving apparatus of claim 8, wherein the first rotating element is a sun gear, wherein the second rotating element is a ring gear, and wherein the third rotating element is a carrier.

18. The vehicle driving apparatus of claim 8, wherein the first rotating element is a ring gear, wherein the second rotating element is a sun gear, and wherein the third rotating element is a carrier.

19. The vehicle driving apparatus of claim 8, wherein the first rotating element is a carrier, wherein the second rotating element is a ring gear, and wherein the third rotating element is a sun gear.

* * * * *